United States Patent [19]
Ko et al.

[11] Patent Number: 5,994,477
[45] Date of Patent: *Nov. 30, 1999

[54] SELECTIVE HYDROGENATION METHOD OF LIVING POLYMER HAVING OLEFINIC DOUBLE BOND

[75] Inventors: Young-Hoon Ko; Hoo-Chae Kim, both of Taejeon, Rep. of Korea

[73] Assignee: Korea Kumho Petrochemical Co., Ltd., Seoul, Rep. of Korea

[ * ] Notice: This patent is subject to a terminal disclaimer.

[21] Appl. No.: 08/998,448

[22] Filed: Dec. 26, 1997

[30] Foreign Application Priority Data

Dec. 28, 1996 [KR] Rep. of Korea .................... 96-75472

[51] Int. Cl.$^6$ .................................................. C08F 8/04
[52] U.S. Cl. .................. 525/338; 525/392.8; 525/332.9; 525/333.1; 525/333.2
[58] Field of Search ...................... 525/338, 334

[56] References Cited

U.S. PATENT DOCUMENTS 5,753,778   5/1998   Ko et al. ................................ 525/339

Primary Examiner—Bernard Lipman
Attorney, Agent, or Firm—Harrison & Egbert

[57] ABSTRACT

There is provided a method for selectively hydrogenating a living polymer having olefinic double bonds. A monomer having at least one conjugated double bond, optionally together with an olefinic monomer, is polymerized in the presence of an alkyllithium polymerization initiator, to give a living polymer. This olefinic living polymer is reacted with a hydrocarbon compound, to give a deactivated living polymer and a hydrocarbon lithium compound. The double bonds within the conjugated dien units of the polymer are selectively hydrogenated in the presence of a monocyclopentadienyltitanium compound which is under the influence of the hydrocarbon lithium compound. The hydrocarbon, which acts as a deactivator of the living polymer, terminates the anion polymerization occurring due to an activated anion of the living polymer and thus, prevents the intermolecular cross-linking of the polymers so that the gelation of the polymers does not occur. In addition, the hydrocarbon lithium serves as a reducing agent for the hydrogenating catalyst, monocyclopentadienyltitanium compound, so that a high selectivity and hydrogenation efficiency can be obtained without accurate adjustment of Li/Ti mole ratio.

10 Claims, No Drawings

SELECTIVE HYDROGENATION METHOD OF LIVING POLYMER HAVING OLEFINIC DOUBLE BOND

BACKGROUND OF THE INVENTION

1. Field of the Invention

The present invention relates to a method for selectively hydrogenating a living polymer having olefinic double bonds. More particularly, the present invention is concerned with a selective hydrogenation method of living polymer having olefinic double bonds, which is superior in yield, selectivity and reproductivity.

2. Description of the Prior Art

Polymers with olefinic double bonds are usually used as elastomers. They may be utilized without any modification or in a modified state, for example, a vulcanized state.

However, the double bonds make the polymers poor in weather resistance, thermal resistance, oxygen resistance and ozone resistance, limiting the use range of the polymers.

This problem has been overcome by hydrogenating the double bonds of the polymers. Generally, the hydrogenation for the olefinic double bonds in polymers is carried out in the presence of a heterogeneous catalyst or a homogeneous catalyst.

A typical heterogeneous catalyst consists of a catalytically active ingredient and a support. The active ingredient, such as platinum and palladium, is impregnated into the support, such as carbon, silica and alumina. For the homogeneous catalyst, a catalytically active ingredient, such as nickel, cobalt and titanium, is mixed with an organometal compound serving as a reductant, such as organoaluminum, organomagnesium and organolithium. Relative to the homogeneous catalysts, heterogeneous catalysts are lower in hydrogenation activity and need a higher temperature and pressure for catalytic reaction. In the case of polymers, the heterogeneous catalysts have more serious difficulty in dehydrogenating them because of the high viscosity of the reaction system and the steric hinderance of the polymers. Thus, the heterogeneous catalyst is economically unfavorable not only because a large quantity of the catalyst is required for effective hydrogenation, but also because the high temperature and pressure causes the polymers to be decomposed and gelled.

In contrast, the homogeneous catalysts are very advantageous by virtue of high reactivity and hydrogenation efficiency even at a low temperature and pressure. However, it is difficult to obtain a product with high yield since the hydrogenation has a tendency to depend sensitively on the reduced state of the homogeneous catalyst. Further, a trace of impurities in the reactants causes the catalytically active ingredients of the homogeneous catalysts to easily lose their activity and thus makes it very difficult to control the hydrogenation efficiency and reproductivity in the reaction.

There are many techniques for the hydrogenation or selective hydrogenation of conjugated diens.

U.S. Pat. Nos. 3,644,588, 3,868,354, 3,541,064 and 3,700,633 disclose catalyst systems for hydrogenating or selectively hydrogenating ethylenically unsaturated polymers or ethylenically unsaturated aromatic copolymers, in which the metals of group VIII on the Periodic Table, especially, nickel or cobalt, are combined with the metals of groups IA, IIA and IIIB on the Periodic Table, especially, lithium, magnesium and aluminum alkyl as reductants.

U.S. Pat. No. 4,501,857 discloses that at least one bis(cyclopentadienyl)titanium compound and at least one hydrocarbon lithium compound are required for the selective hydrogenation of olefinically unsaturated polymers.

Similar to the just above-cited patent, U.S. Pat. No 4,980,421 suggests alkoxylithium compounds as a promoter, instead of hydrocarbon lithium compounds. In this patent, such a promoter may be prepared by directly adding an alcohol or phenol compound to living polymers or it may be the reaction mixture of organolithium compound and alcohol and phenol compound. It is also mentioned, that the hydrogenation system utilizing such a catalyst, is superior in reactivity under mild conditions. However, although reaction stability is accomplished by using alcohols and phenols as promoters, they may deleteriously affect the control of the molecular weight of the polymer upon carrying out continuous processes and the alcohols and phenols remaining unchanged into alkoxylithium may act as a poison against the catalyst activating species.

Another hydrogenation of the polymers having olefinic double bonds is described in U.S. Pat. No. 4,673,714. It is mentioned that the hydrogenation can be easily accomplished by employing bis(cyclopentadienyl) titanium diaryl compound only as a catalyst. This technique is allegedly very effective because it does not need additional alkyllithium compound as a promoter.

In U.S. Pat. No. 5,039,755, a hydrogenation reaction is carried out by adding hydrogen to a living polymer prepared with an alkyllithium initiator, deactivating the polymer under high hydrogen pressure and hydrogenating it in the presence of a titanium catalyst.

The above-cited patents are disadvantageous in that it is quite difficult to simultaneously obtain the high activity of the catalysts and high selectivity of hydrogen addition because the molar ratio of Li/Ti should be controlled depending on the change in the molecular weights of the polymers or the mole numbers of the living polymers. Furthermore, in the case of using living polymers, their anion ions may cause intermolecular cross-links prior to, during and subsequent to the hydrogenation, resulting in the formation of a high molecular weight polymer. In addition, the anions may modify the reduced state of the catalyst, serving as a deactivator thereof.

SUMMARY OF THE INVENTION

There exists a need for a novel catalyst system that shows not only high reactivity and reproductivity even under the change in the molar ratio of Li/Ti, but also is not easily deactivated by a trace of impurities.

Therefore, it is an object of the present invention to provide a method for selectively hydrogenating a living polymer having at least one olefinic double bond with high hydrogenation efficiency and reaction selectivity, in which a catalyst system including a lithium compound and a titanium compound can be used without accurately adjusting the molar ratio of the lithium compound to the titanium compound.

It is another object of the present invention to provide a method for selectively hydrogenating a living polymer having olefinic double bonds with high reproductivity.

It is a further object of the present invention to provide a method for selectively hydrogenating a living polymer having olefinic double bonds, in which a catalyst system including a lithium compound and a titanium compound can be used without the change in the reduced state thereof.

In accordance with the present invention, the above objects could be accomplished by providing a method for selectively hydrogenating a living polymer having olefinic double bonds, comprising the steps of: polymerizing a monomer having at least one conjugated double bond, optionally together with an olefinic monomer, in the presence of an alkyllithium polymerization initiator; reacting the olefinic living polymer with a hydrocarbon compound, to give a deactivated living polymer and a hydrocarbon lithium compound; and selectively hydrogenating the deactivated living polymers by contacting the double bonds present in the conjugated dien units of the polymer with hydrogen in the presence of a monocyclopentadienyltitanium compound, a hydrogenating catalyst.

DETAILED DESCRIPTION OF THE INVENTION

The present invention pertains to use of a novel catalyst system in selectively hydrogenating an ethylenically unsaturated polymer, which is capable of maintaining its reactivity and selectivity high throughout the hydrogenation. In accordance with the present invention, the novel catalyst system comprises a monocyclopentadienyl titanium compound as a main catalytic ingredient and a hydrocarbon lithium as a promoter.

This promoter is prepared by reacting a hydrocarbon compound with a living polymer which comes from a substrate, an ethylenically unsaturated polymer. In detail, a monomer having at least one conjugated double bond, optionally together with olefinic monomer, is polymerized to a living polymer in the presence of an alkyllithium polymerization initiator represented by the following formula I:

$$R'Li_n \quad (I)$$

wherein R' is a $C_1$–$C_{20}$ alkyl group; and n is an integer of 1–4.

Then, as shown in the following reaction formula, this living polymer is reacted with a hydrocarbon compound represented by the following formula II, to give a deactivated living polymer and a hydrocarbon lithium represented by the following formula III:

wherein, Ⓟ is the living polymer; and R is represented by the following formulas:

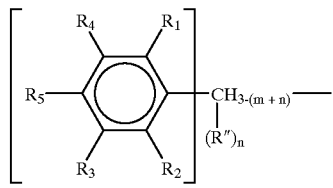

wherein m is an integer of 1 to 3; n is 3-m; and R', $R_1$, $R_2$, $R_3$, $R_4$ and $R_5$, which may be the same or different, each represent a $C_1$–$C_{10}$ alkyl group or a $C_6$–$C_{10}$ arylalkyl group;

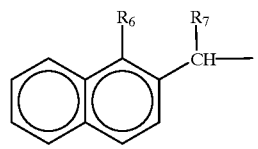

wherein $R_6$ and $R_7$, which are the same or different, each represent a $C_1$–$C_{10}$ alkyl group or a $C_6$–$C_{10}$ arylalkyl group;

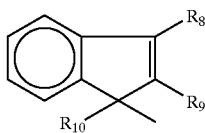

wherein $R_8$, $R_9$ and $R_{10}$, which are the same or different, each represent a $C_1$–$C_{10}$ alkyl group or a $C_6$–$C_{10}$ arylalkyl group;

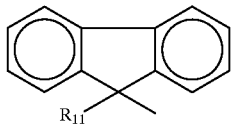

wherein $R_{11}$ represents a $C_1$–$C_{10}$ alkyl group or a $C_6$–$C_{10}$ arylalkyl group.

The catalyst system according to the present invention is comprised essentially of the hydrocarbon lithium obtained and a monocyclopentadienyl titanium represented by the following formula IV:

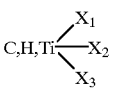

wherein $X_1$, $X_2$ and $X_3$, which are the same or different, each represents a halogen group.

The monocyclopentadienyl titanium acts as a catalytically main active ingredient while the hydrocarbon lithium as a promotor in the catalyst system.

In the presence of the catalyst system, the deactivated polymer is selectively hydrogenated by contacting the double bonds in the conjugated dien units with hydrogen. This catalyst system allows the hydrogenation to be of high selectivity and reproductivity.

In the above hydrogenation, the hydrocarbon compound serves as a terminator of the anion polymerization which occurs due to the anion of the living polymer, as shown the above reaction formula. If the anion is not deactivated, gelation occurs because the intermolecular cross-links form among the polymers. In addition, the use of the hydrocarbon compound prevents the change in the reduced state of the catalyst system.

The selective hydrogenation of a living polymer is carried out through the steps as follow:

(A) Polymerization of a monomer having at least one conjugated double bond or a monomer having at least one conjugated double bond and an olefinic monomer in an organic solvent in the presence of an alkyllithium polymerization initiator represented by the following general formula I:

$$R'Li_n \quad (I)$$

wherein R' and n each are as defined above, to synthesize an olefinic living polymer (B) Reaction of the olefinic living polymer with a hydrocarbon compound represented by the following general formula II, to give a deactivated living polymer and a hydrocarbon lithium compound represented by the following general formula III, as shown in the following reaction formula:

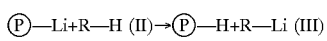

wherein, Ⓟ and R each are as defined above (C) selective hydrogenation of the deactivated living polymers by contacting the double bonds present in the conjugated dien units of the polymer with hydrogen in the presence of bis(cyclopentadienyl)titanium compound represented by the following general formula IV:

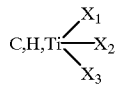

wherein $X_1$, $X_2$ and $X_3$ each are as defined above.

The term "polymers having olefinic double bonds" as used herein refers to all polymers that have intramolecular double bonds. Preferred polymers having olefinic double bonds include random, block and graft copolymers prepared from compounds with conjugated double bonds (hereinafter referred to as "conjugated dien") and olefinic monomers. Typical conjugated diens necessary for the preparation of conjugated dien polymer are hydrocarbons containing 4 to 12 carbon atoms, including 1,3-butadiene, isoprene, 2,3-dimethyl-1,3-butadiene, 1,3-pentadiene, 2-methyl-1,3-pentadiene, 1,3-hexadiene and the like.

Besides the conjugated diens, copolymers of alkenyl aromatic hydrocarbons are needed to obtain commercially useful and valuable elastomers and thermoplastic elastomers. Examples of the alkenyl aromatic hydrocarbons necessary for such copolymers include styrene, t-butylstyrene, methylstyrene and p-methylstyrene with preference to styrene and methylstyrene. The resulting copolymers are exemplified by butadiene/styrene copolymers, isoprene/styrene copolymers, and butadiene/methylstyrene copolymer, each belonging to a random copolymer, a tapered block copolymer, a block copolymer or a graft copolymer.

In order to produce commercially valuable thermoplastic elastomers, the copolymers are required to contain alkenyl aromatic hydrocarbons at an amount of 5 to 95% by weight. The polymer used in the present invention is a kind of a block copolymer having a molecular weight of approximately 1,000 to 1,000,000.

Acting as a polymerization initiator, examples of the alkyllithium compound include methyllithium, propyllithium, isopropyllithium, n-butyllithium, sec-butyllithium, t-butyllithium and pentyllithium with commercial preference to n-butyllithium and sec-butyllithium.

The present invention confers improvements on the hydrogenation of the above polymers. As mentioned above, the living polymer is treated with the hydrocarbon to stop the anion polymerization with ease for a short time and also, to prevent the cross-linking of the polymer. Thus, the gelation of the polymer can be prevented effectively. Further, there is another advantage in that the hydrocarbon lithium of the general formula III, obtained as a by-product, is utilized as a promotor for the hydrogenation reaction.

The hydrocarbon compound of the general formula II used in step B include toluene, ethylbenzene, propylbenzene, ethyltoluene, trimethylbenzene, isopropylbenzene, phenyltoluene, xylene, diphenylmethane, diphenylethane, dimethylbiphenyl, ethylbiphenyl, dimethylpropane, benzylbiphenyl, triphenylmethane, naphthalene, methylnaphthalene, ethylnaphthalene, indene, methylindene, ethylindene, fluorene, methylfluorene, ethyifluorne and the like. Of them, toluene, xylene, diphenylmethane, triphenylmethane, indene and fluorene are preferred in terms of commercial availability.

Generally, any solvent is available for the polymerization step if it has little influence on the hydrogen addition step. Useful are aliphatic hydrocarbons, such as pentane, hexane, heptane and octane, alicyclic compounds, such as cyclopentane, cyclohexane and cycloheptane, and ethers, such as tetrahydrofuran and diethylether. Aromatic hydrocarbons, such as benzene, toluene, xylene and ethyl benzene, are available unless hydrogen addition occurs at their double bonds under the condition of the hydrogen addition step.

With catalytic activity for the hydrogenation of the living polymers, the titanium compounds used in step C are exemplified by monocyclopentadienyltitanium trifluoride, monocyclopentadienyltitanium trichloride, monocyclopenta-dienyltitanium tribromide, and monocyclopentadienyltitanium triiodide. Most advantageous is monocyclopentadienyl titanium trichloride.

In accordance with the present invention, the molar ratio of the lithium compound used in step A to the hydrocarbon lithium compound used in step B is preferably on the order of 1:1 to 1:20 and more preferably 1:1 to 1:5 while that of the hydrocarbon lithium compound used in step B to the titanium compound used in step C preferably ranges from 2:1 to 10:1 and more preferably from 2:1 to 6:1.

The hydrogen addition process is carried out at 0 to 150° C. and preferably at 40 to 120° C. In this process, the partial pressure of hydrogen preferably ranges from 1 to 50 atm and most preferably from 5 to 20 atm. The catalyst is used preferably at an amount of 0.01 to 20 mmol per 100 g of the polymer employed and most preferably 0.05 to 2 mmol. Between 30 to 360 min, the hydrogen addition process is completed. As for the solvent for the hydrogen addition, heptane, pentane, tetrahydrofuran, cyclohexane, hexane and diethylether may be used.

A better understanding of the present invention may be obtained in light of following examples which are set forth to illustrate, but are not to be construed to limit, the present invention.

SYNTHESIS EXAMPLE I

In a 2 gallon autoclave reactor, 4,500 g of cyclohexane was charged, followed by 9 g of tetrahydrofuran, 112.5 g of styrene monomer and 1.7 g of n-butyllithium. This mixture was subjected to polymerization for 1 hr. Then, 525 g of 1,3-butadiene monomer was added in the reactor and polymerization was carried out for 1 hr. Thereafter, 112.5 g of styrene monomer was charged and subjected to further polymerization for 1 hr, to give a styrene-butadiene-styrene block copolymer with a number average molecular weight of about 40,000 in which the styrene bond amounted to 30.4% (block styrene content 29.9%) while the 1,2-vinyl bond content of the butadiene unit amounted to 40.5%. 2.5 mmol of living lithium was found to be contained in per 100 g of the polymer.

SYNTHESIS EXAMPLE II

A styrene-butadiene-styrene living block copolymer with a number-average molecular weight of approximately 60,000 was synthesized in a manner similar to that of Synthesis Example I, except that 1.3 g of n-butyllithium was added. In the living polymer, styrene bond content amounted to 28.9% (block styrene content 28.6%) while 1,2-vinyl bond content of butadiene unit amounted to 39.8%. 1.67 mmol of living lithium was found to be contained in per 100 g of the polymer.

SYNTHESIS EXAMPLE III

A styrene-butadiene-styrene living block copolymer with a number-average molecular weight of approximately 80,000 was synthesized in a manner similar to that of Synthesis Example I, except that 1.1 g of n-butyllithium was added. In the living polymer, styrene bond content amounted to 28.5% (block styrene content 28.0%) while 1,2-vinyl bond content of butadiene unit amounted to 37.3%. 1.25 mmol of living lithium was found to be contained in per 100 g of the polymer.

SYNTHESIS EXAMPLE IV

In a 2 gallon autoclave reactor, 4,500 g of cyclohexane was charged, followed by 9 g of tetrahydrofuran and 1.3 g of n-butyllithium, after which 225 g of styrene monomer and 525 g of 1,3-butadiene monomer were added simultaneously and the resulting mixture was subjected to polymerization for 1 hr, to give a styrene-butadiene-styrene block copolymer with a number-average molecular weight of approximately 60,000 in which styrene content amounted to 29% while the 1,2-vinyl bond content of butadiene unit amounted to 30.5%. 1.67 mmol of living lithium was found to be contained in per 100 g of the polymer.

SYNTHESIS EXAMPLE V

A styrene-isoprene-styrene living block copolymer with a number-average molecular weight of approximately 60,000 was synthesized in a manner similar to that of Synthesis Example I, except that 1.3 g of n-butyllithium was added and isoprene, instead of 1,3-butadiene, was used. In the living polymer, styrene bond content amounted to 29.7% (block styrene content 28.8%) while 1,2-vinyl bond content of isoprene unit amounted to 35.4%. 1.67 mmol of living lithium was found to be contained in per 100 g of the polymer.

EXAMPLE I

In a 10 liter autoclave completely dried, 2,100 g of the 14.3 wt % living polymer solution obtained in Synthesis Example I was poured and then, treated with 50 ml of a cyclohexane solution containing 7.5 mmol of toluene as a polymerization terminator for 1 hr while the pressure within the reactor was maintained at 5 kg/cm$^2$. After confirmation of the change of the yellow living polymer into a colorless one, a hydrogen addition reaction was performed at a hydrogen partial pressure of 5 kg/cm$^2$ for 1 hr in the presence of 1.5 mmol of monocyclopentadienyltitanium trichloride acting as a hydrogenating catalyst. After completion of the reaction, the autoclave was returned to room temperature and atmosphere pressure. The reaction solution was poured into boiling water, to give a white polymer. Its hydrogen addition percentage was analyzed by H-NMR and the result is given as shown in Table 1 below.

EXAMPLE II THROUGH VI

Hydrogen addition reactions were carried out in a manner similar to that of Example I, except for using 7.5 mmol of xylene, diphenylmethane, triphenylmethane, indene and fluorene, instead of toluene, respectively. The results are given as shown in Table 1 below.

Comparative Example I

A hydrogen addition reaction was carried out in a manner similar to that of Example I, except that the living polymer was not treated with the hydrocarbon compound. The result is given as shown in Table I below.

TABLE 1

Hydrogen Addition of the Living Polymers Treated with Reaction Terminator

| Exam. Nos. | Living Polymer | Polymerization Terminator | Hydrogen Addition Percent | |
|---|---|---|---|---|
| | | | Butadiene | Styrene |
| I | [1]S.E. I | Toluene | 97.3 | <1 |
| II | [1]S.E. I | Xylene | 96.7 | <1 |
| III | [1]S.E. I | [2]DPM | 95.3 | <1 |
| IV | [1]S.E. I | [3]TPM | 97.6 | <1 |
| V | [1]S.E. I | Indene | 96.1 | <1 |
| VI | [1]S.E. I | Fluorene | 97.2 | <1 |
| C.I | [1]S.E. I | — | 62.0 | <1 |

[1]obtained in Synthesis Example I
[2]Diphenyl methane
[3]Triphenyl methane

As apparent from Table 1, the hydrogen addition percentages of butadiene unit are higher when using the reaction terminators than when using no terminator.

EXAMPLE VII THROUGH IX

Hydrogen addition reactions were carried out in a manner similar to that of Example I, except that a solution containing 14.3 wt % of the living polymer obtained in Synthesis Example II was used and 50 ml of a cyclohexane solution containing 7 mmol of each of toluene, trimethyl methane and fluorene as a polymerization terminator was added. The results are given as shown in Table 2 below.

EXAMPLE X THROUGH XIII

Hydrogen addition reactions were carried out in a manner similar to that of Example I, except that a solution containing 14.3 wt % of the living polymer obtained in Synthesis Example III was used and 50 ml of a cyclohexane solution containing 7 mmol of each of toluene, diphenyl methane and triphenyl methane as a reaction terminator were added. The results are given as shown in Table 2 below.

TABLE 2

| Exam. Nos. | Living Polymer | Polymerization Terminator | Hydrogen Addition Percent | |
|---|---|---|---|---|
| | | | Butadiene | Styrene |
| VII | [1]S.E. II | Toluene | 97.6 | <1 |
| VIII | [1]S.E. II | [2]TPM | 96.3 | <1 |
| IX | [1]S.E. II | Fluorene | 96.5 | <1 |
| X | [1]S.E. II | Toluene | 97.1 | <1 |
| XI | [1]S.E. II | [3]DPM | 96.9 | <1 |
| XII | [1]S.E. II | [3]TPM | 95.8 | <1 |
| XIII | [1]S.E. II | Fluorene | 96.7 | <1 |

[1]obtained in Synthesis Examples
[2]Triphenyl methane
[3]Diphenyl methane

EXAMPLES XIV THROUGH XXII

Hydrogen addition reactions were carried out in a manner similar to that of Example I, except that the living solutions obtained in Synthesis Examples I through V were treated with various amounts of toluene, as indicated in Table 3 below.

TABLE 3

Hydrogen Addition of the Living Polymers Treated with Toluene

| Exam. Nos. | Living Polymer | Toluene (mmol) | Molar Ratio Toleene/Li | Li/Ti | Hydrogen Addition Percent Butadiene | Styrene |
|---|---|---|---|---|---|---|
| XIV | [1]S.E. I | 7.5 | 1.0 | 4.9 | 97.3 | <1 |
| XV | [1]S.E. I | 15.0 | 2.0 | 4.9 | 95.4 | <1 |
| XVI | [1]S.E. I | 22.5 | 3.0 | 4.9 | 96.7 | <1 |
| XVII | [1]S.E. II | 7.5 | 1.5 | 3.3 | 93.8 | <1 |
| XVIII | [1]S.E. II | 10.0 | 2.0 | 3.3 | 95.4 | <1 |
| XIX | [1]S.E. III | 5.6 | 1.5 | 2.4 | 96.8 | <1 |
| XX | [1]S.E. III | 7.5 | 2.0 | 2.4 | 97.2 | <1 |
| XXI | [1]S.E. IV | 10.0 | 2.0 | 3.3 | 93.1 | <1 |
| XXII | [1]S.E. V | 10.0 | 2.0 | 3.3 | 95.3 | <1 |

[1]obtained in Synthesis Examples

EXAMPLES XXIII THROUGH XXV

Hydrogen addition reactions were carried out in a manner similar to that of Example I, except that the living polymer solution obtained in Synthesis Example II was treated with fluorene and the molar ratio of lithium/titanium was changed as indicated in Table 4. below.

Comparative Examples II Through V

Hydrogen addition reactions were carried out in a manner similar to that of Example I, except that the living polymer obtained in Synthesis Example II was not treated with any reaction terminator and the molar ratio of lithium/titanium was changed as indicated in Table 4, below. The results are given as shown in Table 4 below,

TABLE 4

Hydrogen Addition of the Living Polymers Treated with Fluorene

| Exam. Nos. | Living Polymer | Toluene (mmol) | Molar Ratio Li/Ti | Hydrogen Addition Percent Butadiene | Styrene |
|---|---|---|---|---|---|
| XXIII | [1]S.E. II | 6.0 | 4.0 | 97.5 | <1 |
| XXIV | [1]S.E. II | 6.0 | 5.3 | 96.3 | <1 |
| XXV | [1]S.E. II | 6.0 | 7.5 | 95.9 | <1 |
| C.II | [1]S.E. II | — | 2.5 | 58.9 | <1 |
| C.III | [1]S.E. II | — | 4.0 | 70.3 | <1 |
| C.IV | [1]S.E. II | — | 8.5 | 60.4 | <1 |
| C.V | [1]S.E. II | — | 10.6 | 64.1 | <1 |

[1]obtained in Synthesis Example II

It is apparent from the above examples that the hydrogen addition without treatment using the reaction terminator is poor, relative to those with treatment of the reaction terminator. In addition, the hydrogen addition without treatment using the reaction terminator depends sensitively on the molar ratio of lithium/titanium, showing poor reproductivity of hydrogenation.

As described hereinbefore, the present invention is characterized in that a living polymer having olefinic double bonds is deactivated by the reaction with a hydrocarbon compound prior to hydrogenation and the hydrocarbon lithium thus obtained as a by-product of the reaction can be used as a promotor in a catalyst system for the selective hydrogenation of the living polymer, which comprises a monocyclopentadienyl titanium compound as a catalytically main active ingredient. The hydrocarbon, which acts as a deactivator of the living polymer, terminates the anion polymerization proceeded by an activated anion of the living polymer and thus, prevents the intermolecular cross-linking of the polymers so that the gelation of the polymers does not occur. Further, the hydrocarbon lithium serves as a reducing agent for the hydrogenating catalyst, monocyclopentadienyltitanium compound, so that a high selectivity and hydrogenation efficiency can be obtained without accurate adjustment of Li/Ti mole ratio.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for selectively hydrogenating a living polymer having olefinic double bonds, comprising the steps of:

polymerizing a monomer having at least one conjugated double bond, optionally together with an olefinic monomer, in an organic solvent in the presence of an alkyllithium polymerization initiator represented by the following general formula I:

$$R'Li_n \qquad (I)$$

wherein R' is a $C_1$–$C_{20}$ alkyl group; and n is an integer of 1–4, to synthesize an olefinic living polymer;

reacting the olefinic living polymer with a hydrocarbon compound represented by the following general formula II, to give a deactivated living polymer and a hydrocarbon lithium compound represented by the following general formula III, as shown in the following reaction formula:

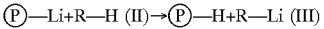
Ⓟ—Li+R—H (II)→Ⓟ—H+R—Li (III)

wherein, Ⓟ is the living polymer; and R is represented by the following formulas:

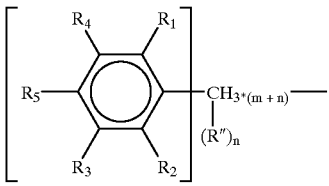

wherein m is an integer of 1 to 3; n is 3-m; and R', $R_1$, $R_2$, $R_3$, $R_4$ and $R_5$, which may be the same or different, each represent a $C_1$–$C_{10}$ alkyl group or a $C_6$–$C_{10}$ arylalkyl group;

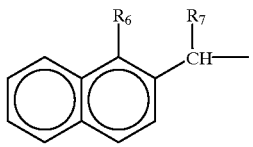

wherein $R_6$ and $R_7$, which are the same or different, each represent a $C_1$–$C_{10}$ alkyl group or a $C_6$–$C_{10}$ arylalkyl group;

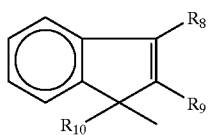

wherein $R_8$, $R_9$ and $R_{10}$, which are the same or different, each represent a $C_1$–$C_{10}$ alkyl group or a $C_6$–$C_{10}$ arylalkyl group;

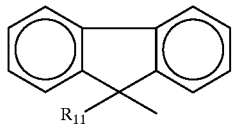

wherein $R_{11}$ represents a $C_1$–$C_{10}$ alkyl group or a $C_6$–$C_{10}$ arylalkyl group; and selectively hydrogenating the deactivated living polymers by contacting the double bonds present in the conjugated dien units of the polymer with hydrogen in the presence of bis(cyclopentadienyl)titanium compound represented by the following general formula IV:

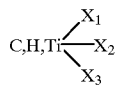

wherein $X_1$, $X_2$ and $X_3$, which are the same or different, each represents a halogen group.

2. A method in accordance with claim 1, wherein said monomer having at least one conjugated double bond is selected from 1,3-butadiene and isoprene and said olefinic monomer is selected from styrene and α-methylstyrene.

3. A method in accordance with claim 1, wherein said living polymer is a random copolymer, a block copolymer, a tapered block copolymer or a graft copolymer of conjugated double bond monomer and olefinic monomer.

4. A method in accordance with claim 1, wherein said alkyllithium is n-butyllithium or sec-butyllithium.

5. A method in accordance with claim 1, wherein said compound of general formula II is selected from the group consisting of toluene, ethylbenzene, propylbenzene, ethyltoluene, trimethylbenzene, isopropylbenzene, phenyltoluene, xylene, diphenlymethane, diphenylethane, dimethylbiphenyl, ethylbiphenyl, dimethylpropane, benzylbiphenyl, triphenylmethane, naphthalene, methylnaphthalene, ethylnaphthalene, indene, methylindene, ethylindene, fluorene, methylfluorene and ethylfluorene.

6. A method in accordance with claim 1, wherein said monocyclopentadienyltitanium compound is monocyclopeptadienyltitanium chloride.

7. A method in accordance with claim 1, wherein said alkyllithium and said hydrocarbon compound of general formula II are used at a molar ratio of 1:1 to 1:5.

8. A method in accordance with claim 1, wherein said alkyllithium and said monocyclopentadienyltitanium compound are used at a molar ratio of 2:1 to 6:1.

9. A method in accordance with claim 1, wherein the hydrogenation is carried out at 0 to 150° C. for 30 to 360 min under a hydrogen partial pressure of 1 to 50 atm by use of the catalyst at an amount of 0.01 to 20 mmol based on 100 g of said polymer.

10. A method in accordance with claim 9, wherein the hydrogenation is carried out at 40 to 120° C. under a hydrogen partial pressure of 5 to 20 atm by use of the catalyst at an amount of 0.05 to 2 mmol based on 100 g of said polymer.

* * * * *